(No Model.)

W. J. ERSKINE.
HAY RACK.

No. 537,761. Patented Apr. 16, 1895.

Witnesses
Geo. E. Frech
James V. Berard

Inventor
W. J. Erskine
By Lehmann Pattison & Heath
Attorneys

UNITED STATES PATENT OFFICE.

WILLIAM JAMES ERSKINE, OF KOSSE, TEXAS.

HAY-RACK.

SPECIFICATION forming part of Letters Patent No. 537,761, dated April 16, 1895.

Application filed September 25, 1894. Serial No. 524,100. (No model.)

*To all whom it may concern:*

Be it known that I, WILLIAM JAMES ERSKINE, of Kosse, in the county of Limestone and State of Texas, have invented certain new and useful Improvements in Hay-Racks; and I do hereby declare the following to be a full, clear, and exact description of the invention, such as will enable others skilled in the art to which it pertains to make and use the same, reference being had to the accompanying drawings, which form part of this specification.

My invention relates to an improved hay rack; and the object of the same is to provide an improved device for holding or clamping hay within reach of live stock, and which while not impairing the feeding of the stock will prevent them from pulling the hay down beneath their feet.

The invention consists in the novel features of construction hereinafter fully described and claimed, and illustrated in the accompanying drawings, in which—

Figure 1:
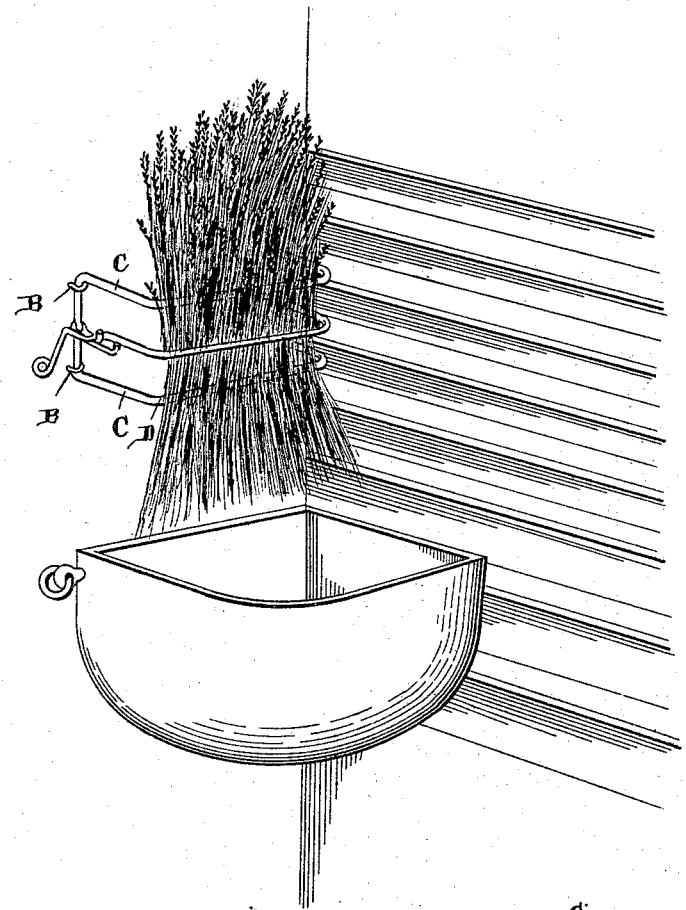
Figure 2:
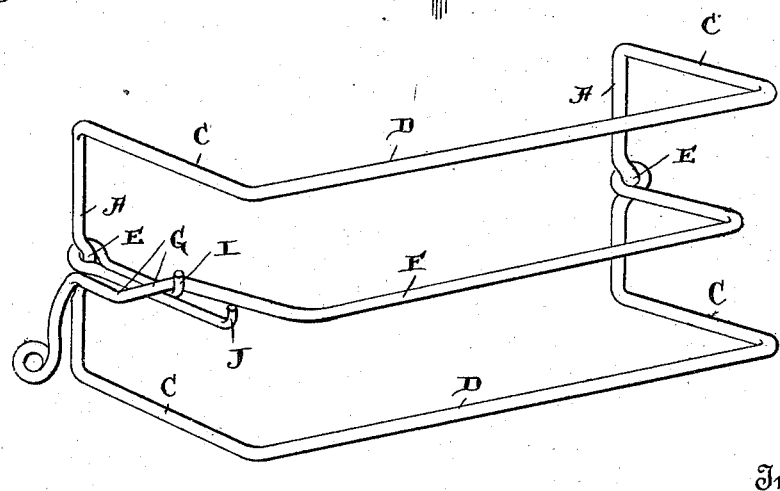

Figure 1 is a perspective view of my improved rack with the hay confined therein. Fig. 2 is a similar view with the rack empty.

The rack consists of the vertical bars A which are secured by staples B to the wall of the building or stall. From the upper and lower ends of these bars extend the arms C, the respective pairs being connected by the parallel horizontal arms or bars D. Bars A are bulged between their ends to form eyes E and confined at one end in one of the eyes is the longitudinal lever F which at said end is angular as shown. The opposite end of the lever is formed with bends G arranged in step fashion, and these bends are adapted to be engaged by either the short hook I or long hook J secured to eye E of the other bar A.

In operation the section of baled or other hay is laid across arms D and the lever F is pressed thereon as in Fig. 1 and secured by either one of the hooks, thus holding the hay firmly in place.

Having thus fully described my invention, what I claim as new, and desire to secure by Letters Patent, is—

1. An improved hay rack comprising a frame having the separated bars D, D, the tongue F hinged at one end so as to swing between the bars, the bend G in the free end of the tongue, and the hooks I, I, for engaging the said bend for holding the tongue in different adjustments, for the purpose described.

2. An improved hay rack comprising bars A, arms C, arms D, the lever angular at one end and hinged to one of the bars A, and the hooks secured to the other bar A for engaging the free end of the lever in the manner shown and described.

3. In a hay rack the combination of parallel bars D having their ends turned backward to form brackets or supports, staples B for securing them in position, the tongue E made angular at its hinge end and formed with a step at its opposite end, and the hook J for engaging said step, substantially as shown and described.

In testimony whereof I affix my signature in presence of two witnesses.

WILLIAM JAMES ERSKINE.

Witnesses:
J. G. ADAMS,
J. R. BRYANT.